US010139006B2

(12) United States Patent
Muraoka

(10) Patent No.: US 10,139,006 B2
(45) Date of Patent: Nov. 27, 2018

(54) SOLENOID VALVE DEVICE

(71) Applicant: NIDEC TOSOK CORPORATION, Zama, Kanagawa (JP)

(72) Inventor: Keiichiro Muraoka, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 54 days.

(21) Appl. No.: 15/295,187

(22) Filed: Oct. 17, 2016

(65) Prior Publication Data

US 2017/0114916 A1 Apr. 27, 2017

(30) Foreign Application Priority Data

Oct. 22, 2015 (JP) .................. 2015-208397

(51) Int. Cl.
*F16K 27/02* (2006.01)
*F16H 61/02* (2006.01)
*F16K 1/14* (2006.01)
*F16K 31/06* (2006.01)

(52) U.S. Cl.
CPC ....... *F16K 27/029* (2013.01); *F16H 61/0251* (2013.01); *F16K 1/14* (2013.01); *F16K 31/0665* (2013.01); *F16K 31/0675* (2013.01)

(58) Field of Classification Search
CPC ...... F16K 27/029; F16K 1/14; F16K 27/0245; F16K 27/048; Y10T 137/5987; H01F 7/126; H01F 7/127; H01F 7/1607; H01F 7/16; H01F 7/1623; H01F 2007/1676; F16H 2061/0253

USPC ................. 335/255, 278, 281; 251/129.15; 137/315.03

See application file for complete search history.

(56) References Cited

U.S. PATENT DOCUMENTS 5,853,028 A * 12/1998 Ness .................. G05D 16/2013
                                                    137/625.65
5,967,487 A * 10/1999 Cook ................. F02M 25/0836
                                                    251/129.07
6,598,852 B2 * 7/2003 Tomoda .............. F16K 31/0631
                                                    251/129.14
6,943,657 B2 * 9/2005 Subramanian ...... F16K 31/0637
                                                    251/129.15

(Continued)

FOREIGN PATENT DOCUMENTS

JP    H11173449 A    6/1999
JP    2002188744 A   7/2002
JP    2003207069 A   7/2003

*Primary Examiner* — Matthew W Jellett
(74) *Attorney, Agent, or Firm* — Cantor Colburn LLP

(57) ABSTRACT

A solenoid valve device may include a solenoid unit including a rod pin movable; a cylindrical core arranged around the rod pin; a bobbin covering a side surface of the cylindrical core; a coil wound around the bobbin; and a case having a bottom and being cylindrical, having an opening portion at one axial end, and arranged to accommodate the rod pin, the cylindrical core, the bobbin, and the coil; and a nozzle unit. The nozzle unit may include a nozzle having a pin receiving portion and a port opening portion; a first port and a second port; a valve body arranged in the nozzle; and a first metal member fixed to an end portion of the nozzle. The solenoid unit may include a positioning contact portion; and the case may include a fixing portion to fix the first metal member between the positioning contact portion and the fixing portion.

5 Claims, 9 Drawing Sheets

(56) References Cited

U.S. PATENT DOCUMENTS

| | | | | |
|---|---|---|---|---|
| 6,955,337 B2* | 10/2005 | Weber | ............... | F16K 31/0651 |
| | | | | 137/315.03 |
| 7,021,256 B2* | 4/2006 | Wagner | ............. | F16K 31/0637 |
| | | | | 123/90.11 |
| 8,480,055 B2* | 7/2013 | Strauss | .................. | H01F 7/081 |
| | | | | 251/129.15 |
| 8,714,519 B2* | 5/2014 | Voss | ...................... | B60T 8/363 |
| | | | | 251/129.15 |
| 8,925,582 B2* | 1/2015 | Lee | ...................... | F01L 13/00 |
| | | | | 137/596.17 |
| 9,556,968 B2* | 1/2017 | Mayr | ................. | F16K 31/0634 |
| 9,714,721 B2* | 7/2017 | Nanahara | ............... | B60T 7/042 |
| 2013/0264507 A1* | 10/2013 | Schnelker | ......... | F16K 31/0665 |
| | | | | 251/129.15 |

* cited by examiner

SOLENOID VALVE DEVICE

CROSS REFERENCE TO RELATED APPLICATIONS

The present invention claims priority under 35 U.S.C. § 119 to Japanese Application No. 2015-208397 filed Oct. 22, 2015, the entire content of which is incorporated herein by reference.

BACKGROUND

Field of the Invention

At least an embodiment of the present invention relates to a solenoid valve device used in, for example, an automatic transmission of a vehicle.

Description of the Related Art

A control valve is typically provided in an automatic transmission of a vehicle to control a transmission system. The control valve controls the transmission system by supplying a hydraulic pressure of a predetermined magnitude to the transmission system or stopping the supply using a solenoid valve device.

Such solenoid valve devices are described in, for example, JP-A 2003-207069 and JP-A 2002-188744. The solenoid valve device described in JP-A 2003-207069 is an on-off solenoid valve, and this solenoid valve device includes a nozzle in which a valve body is accommodated, and a solenoid to drive the valve body. The solenoid includes a cylindrical case, and a bobbin around which a coil is wound, a fixed core, and a rod pin arranged to reciprocate in a center of the coil are accommodated in the cylindrical case. In the solenoid valve device, the coil of the solenoid is energized to cause the rod pin to reciprocate, and a tip of the rod pin causes opening and closing of the valve body.

In the solenoid valve device described in JP-A 2003-207069, the bobbin around which the coil of the solenoid is wound and the nozzle in which the valve body is accommodated are integrally molded of a resin. The fixed core (also referred to as a yoke) and the valve body are integrally incorporated in the resin by an insert molding process.

The flow characteristic of the solenoid valve device generally needs to be adjusted in accordance with the purpose of the solenoid valve device or the like. In order to adjust the flow characteristic of the solenoid valve device during a process of manufacturing the solenoid valve device, one or both of the following measures, for example, are taken:

(1) changing the dimensions and shape of an oil passage on the valve body side; and (2) changing the number of turns of the coil on the bobbin side and the shape of the bobbin side, for example.

However, in the case where the bobbin and the nozzle are integrally molded of the resin as in the solenoid valve device described in JP-A 2003-207069, taking even only one of the above measures (1) and (2) would require a specially-designed mold, making an operation of changing the flow characteristic cumbersome.

In particular, in the case where the solenoid valve device is attached to a control valve, not only flow adjustment is necessary, but also an attachment structure for attachment of the solenoid valve device may vary between different types of control valves. For example, the following attachment structures for attachment holes defined in control valves are known.

(3) A nozzle with an O-ring fitted to an outer circumference thereof is fitted into the attachment hole, with the result that a gap between the nozzle and a wall surface of the attachment hole is sealed with the O-ring.

(4) A metal member is used as an entire nozzle or an outer circumferential portion of the nozzle to improve accuracy in an outside diameter of the nozzle, and the nozzle is tightly fitted into the attachment hole without use of a sealing member such as, for example, an O-ring.

Even in the case where such different attachment structures for control valves are required, it has been necessary to manufacture resin-molded articles including specially-designed nozzles in related art.

Standardization of parts has been proposed for the case where solenoid valve devices having different characteristics are manufactured in accordance with required specifications. According to the invention described in JP-A 2002-188744, for example, a nozzle and a bobbin portion are integrally molded of a resin to define a common part, and this common part is used for different cores and rod pin portions, which are designed in accordance with required specifications. However, in the solenoid valve device described in JP-A 2002-188744, a coil portion and a nozzle portion, which constitute a factor that affects the flow characteristic, are integral with each other, and therefore, the operation of changing the flow characteristic is still cumbersome. In addition, the invention described in JP-A 2002-188744 is not able to cope with the case where different attachment structures for control valves, such as the attachment structures (3) and (4) described above, are required.

At least an embodiment of the present invention is able to cope with a change in a flow characteristic of a solenoid valve device, and a change in an attachment structure for a control valve, with a simple structure, for example.

SUMMARY

A solenoid valve device according to an embodiment of the present invention includes:

(1) a solenoid unit including:
(1-1) a rod pin movable in an axial direction;
(1-2) a cylindrical core made of a magnetic material, and arranged around the rod pin to guide the rod pin;
(1-3) a bobbin made of a resin, and arranged to cover a side surface of the cylindrical core;
(1-4) a coil wound around the bobbin; and
(1-5) a case having a bottom and being cylindrical, having an opening portion at one axial end thereof, and arranged to accommodate the rod pin, the cylindrical core, the bobbin, and the coil; and (2) a nozzle unit defined separately from the solenoid unit, and including:
(2-1) a nozzle made of a resin, and including a pin receiving portion in which the rod pin is inserted at one end thereof, and a port opening portion at another end thereof;
(2-2) a first port and a second port each of which is defined in the nozzle;
(2-3) a valve body arranged in the nozzle, and driven by the rod pin to open or close a communication between the first and second ports; and
(2-4) a first metal member fixed to an end portion of the nozzle on a side on which the rod pin is received; wherein (3) the solenoid unit includes a positioning contact portion; and (4) the case includes a fixing portion arranged to fix the first metal member between the positioning contact portion and the fixing portion.

The solenoid valve device according to an embodiment of the present invention may have any of the following features.

(1) The first metal member is a ring-shaped plate fixed to a circumference of the pin receiving portion.

(2) The solenoid valve device further includes a second metal member defined by a ring-shaped plate fixed to an end portion of the case on a side on which the opening portion is defined, wherein the fixing portion is arranged to fix the first and second metal members between the positioning contact portion and the fixing portion with the first and second metal members placed one upon the other.

(3) At least one of the first and second metal members includes a plurality of holes defined therein, the resin of the nozzle or the resin of the bobbin is arranged in each of the holes, so that the first metal member and the nozzle made of the resin, or the second metal member and the bobbin made of the resin, are fixed to each other.

(4) Each of the first and second metal members includes the plurality of holes defined therein, the plurality of holes including a first hole and a second hole; the resin of the nozzle or the resin of the bobbin is arranged in the first hole to penetrate through the corresponding metal member to fix the first metal member and the nozzle, or the second metal member and the bobbin, to each other; and in the second hole of one of the first and second metal members, a projecting portion of the resin penetrating through the first hole of another one of the first and second metal members placed upon the one of the first and second metal members is arranged.

(5) The positioning contact portion is a shoulder portion defined in an inner circumferential surface of the case.

(6) The first metal member is arranged to be in contact with the bobbin, and the positioning contact portion is arranged at such a position as to prevent the bobbin made of the resin from moving in the axial direction in the case.

(7) The nozzle made of the resin is to be fitted into an attachment hole defined in a control valve of a transmission for attachment of the solenoid valve device; the nozzle unit further includes a metal cover arranged to cover an entire outer circumferential surface of the nozzle made of the resin; and the metal cover is arranged to close a gap between a wall surface of the attachment hole for the attachment of the solenoid valve and an outer circumferential surface of the nozzle made of the resin.

(8) The nozzle made of the resin is to be fitted into an attachment hole defined in a control valve of a transmission for attachment of a solenoid valve; the nozzle unit further includes a ring-shaped sealing member arranged on an outer circumferential surface of the nozzle made of the resin; and the sealing member is arranged to close a gap between a wall surface of the attachment hole for the attachment of the solenoid valve and an outer circumferential surface of the nozzle made of the resin.

According to an embodiment of the present invention, a solenoid unit and a nozzle unit defined by separate members are combined to form a solenoid valve device, and this makes it possible to combine various types of nozzle units with the solenoid unit, which is used in common, to easily form solenoid valve devices having various structures, for example.

The above and other features, elements, steps, characteristics and advantages of the present invention will become more apparent from the following detailed description of embodiments of the present invention with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

1. First Embodiment
1-1. Structure

Hereinafter, a first embodiment of the present invention will be described with reference to FIGS. 1, 2, 3, 4, 5, and 6. In the present embodiment, an "axis" refers to a central axis extending along a longitudinal direction of an oil introducing portion, and a "circumferential direction" and an "axial direction" refer to a circumferential direction about the central axis and an axial direction of the central axis, respectively, unless otherwise noted.

A nozzle unit 2 according to the present embodiment is of a normally low type.

Figure 1:
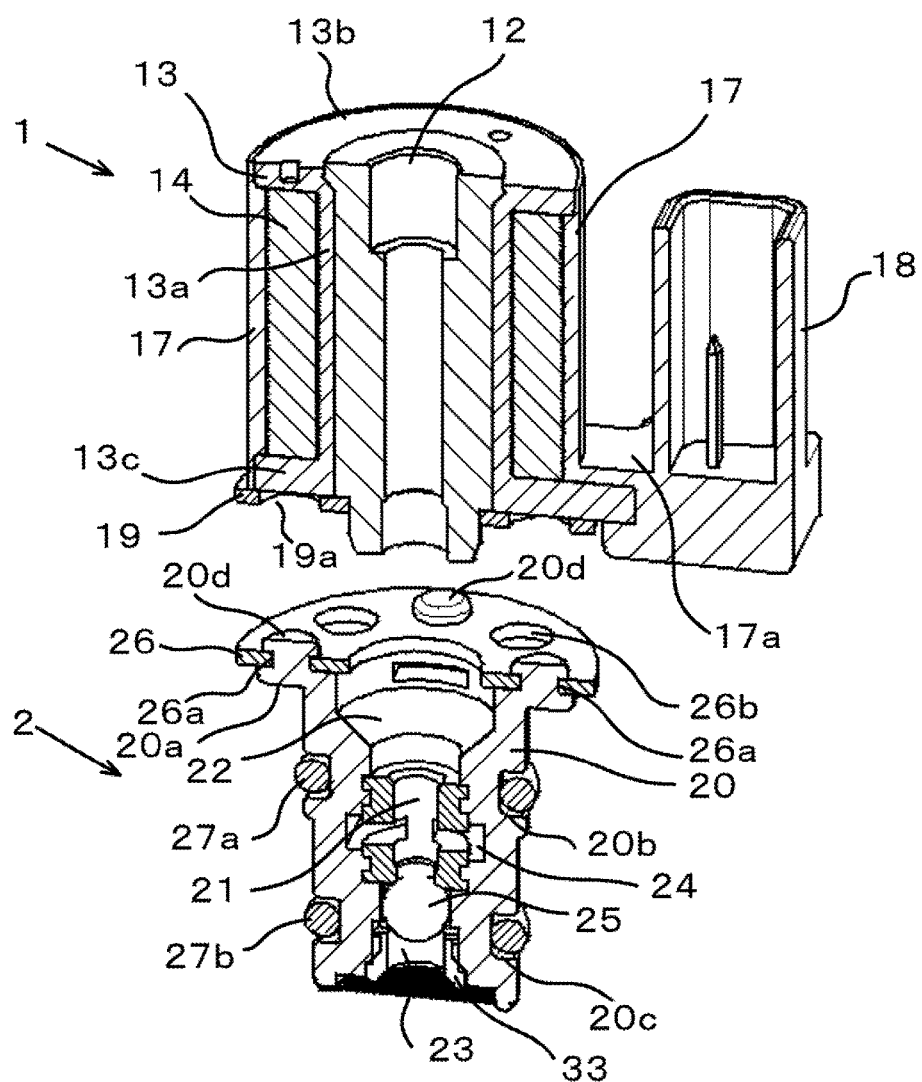
FIG. 1 is a perspective sectional view of a solenoid valve device according to a first embodiment of the present invention in a disassembled condition with a case removed therefrom when viewed obliquely from above.
Figure 2:
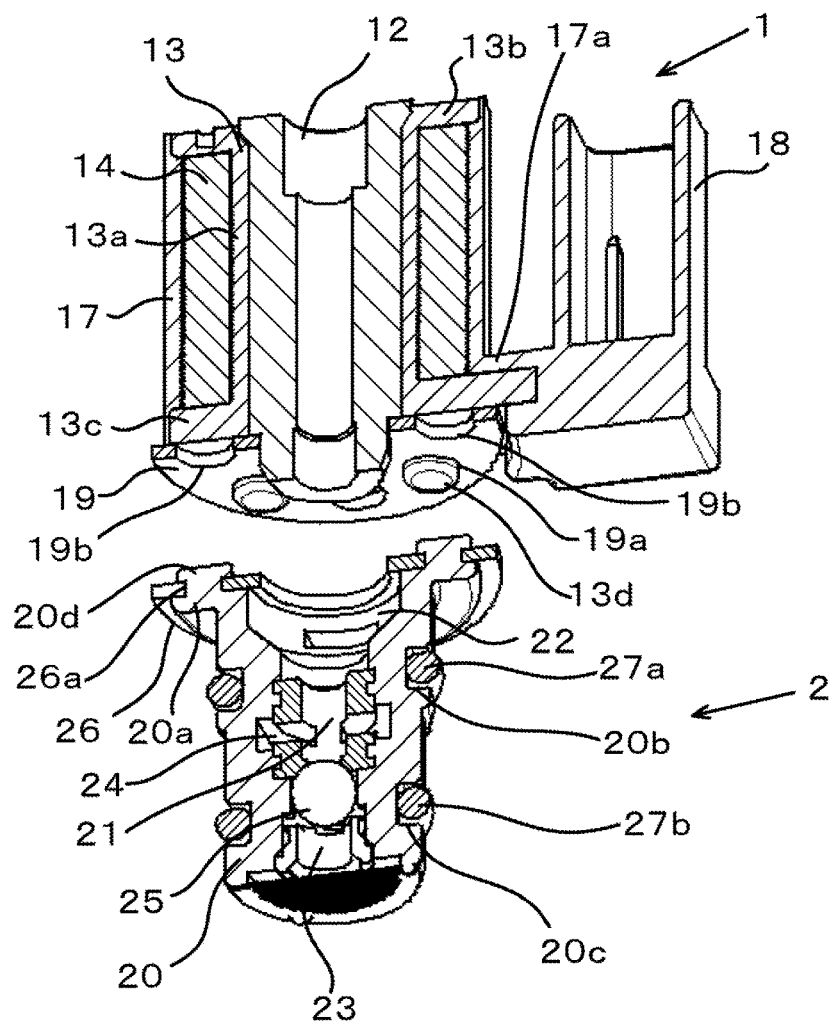
FIG. 2 is a perspective sectional view of the solenoid valve device according to the first embodiment of the present invention in the disassembled condition with the case removed therefrom when viewed obliquely from below.

That is, in a solenoid valve device according to the present embodiment, a valve is normally closed, and when the valve is opened, a high-pressure oil is outputted. As illustrated in FIGS. 1 and 2, the solenoid valve device according to the present embodiment is made up of a solenoid unit 1 and the nozzle unit 2, which are defined by separate members.

(1) Solenoid Unit

The solenoid unit 1 includes a case 10 having a bottom and being cylindrical, and having an opening at one axial end thereof. A rod pin 11 which is movable in the axial direction of the solenoid unit 1 is arranged in a center of the case 10. A first end portion of the rod pin 11 is arranged to project toward the nozzle unit 2 through an opening portion of the case 10, while a second end portion of the rod pin 11 is arranged to face a central portion of a bottom portion of the case 10.

A cylindrical core 12 made of a magnetic material is arranged around the rod pin 11, and the rod pin 11 is guided by the cylindrical core 12. A side surface of the cylindrical core 12 is covered with a bobbin 13 made of a resin, and a coil 14 is wound around an outer circumference of the bobbin 13. More specifically, the bobbin 13 includes a cylindrical portion 13*a* and flanges 13*b* and 13*c* arranged at both ends of the cylindrical portion 13*a*, and the coil 14 is wound around the cylindrical portion 13*a*. The flange 13*b* is arranged to face the bottom portion of the case 10, while the other flange 13*c* is arranged to close the opening portion of the case 10. End portions of the cylindrical core 12 and the rod pin 11, which are arranged inside of the bobbin 13, are arranged to project toward the nozzle unit 2 from the flange 13*c* and an edge of the opening portion of the case 10.

The rod pin 11, the cylindrical core 12, the bobbin 13, and the coil 14 are accommodated in the case 10. At the bottom portion of the case 10, a fixing disc 16 in the shape of a disk is arranged to face an end surface of the cylindrical core 12 and the flange 13*a*, and the second end portion of the rod pin 11 is fixed to a central portion of the fixing disc 16.

The outer circumference of the bobbin 13 and an outer circumference of the coil 14 are coated with a cylindrical molding member 17 arranged along an inner surface of the case 10. A connector 18, which is arranged outside of the case 10, is integrally molded with the molding member 17. More specifically, a cut 10*a* is defined at an end portion of the case 10 near the opening portion thereof, and a junction 17*a* of the molding member 17 and the connector 18 is positioned in the cut 10*a* to allow the molding member 17 and the connector 18, which are arranged one inside and the other outside of the case 10, to be joined to each other.

A second metal member as recited in the claims is fixed to a surface of the flange 13*c* which faces away from the case 10. In the present embodiment, the second metal member is a ring-shaped plate 19 fixed to an outer circumference of the cylindrical core 12. The plate 19 includes, in a central portion thereof, an opening portion in which the end portions of the rod pin 11 and the cylindrical core 12 on the side closer to the nozzle unit 2 are inserted, and the plate 19 has such an outside diameter that the plate 19 can be fitted to an inner circumference of the case 10.

The plate 19 includes a plurality of first holes 19*a* and a plurality of second holes 19*b* defined therein, and the first holes 19*a* and the second holes 19*b* are arranged alternately. A portion of the resin of the bobbin 13 penetrates through each first hole 19*a*, so that the plate 19 and the bobbin 13 are fixed to each other. A tip portion of the resin of the bobbin 13 arranged in each first hole 19*a* defines a projecting portion 13*d* arranged to project toward the nozzle unit 2 from a surface of the plate 19.

Arrangement of the resin of the bobbin 13 in each first hole 19*a* of the plate 19 can be achieved in the following manner. That is, the projecting portion 13*d* is defined on the surface of the flange 13*c* of the bobbin 13 when the bobbin 13 is molded, the projecting portion 13*d* is inserted into the first hole 19*a*, and a tip of the projecting portion 13*d* is thereafter subjected to heat welding, so that the plate 19 and the flange 13*c* are fixed to each other. Alternatively, the plate 19 and the bobbin 13 may be fixed to each other by molding the bobbin 13 by an insert molding process with the plate 19 as an insert.

At an inner circumference of the opening portion of the case 10, a shoulder portion 10*b* having a relatively small inside diameter on the side closer to the bottom of the case 10 and a relatively large outside diameter on the side closer to the opening portion of the case 10 is defined by making the thickness of an edge of the case 10 smaller than the thickness of a remaining portion of a cylindrical portion of the case 10. The shoulder portion 10*b* corresponds to a positioning contact portion as recited in the claims, and an outer circumferential portion of the plate 19 is engaged with the shoulder portion 10*b* to restrain the plate 19 from moving further into the case 10.

The portion of the opening portion of the case 10 which is reduced in thickness is arranged to have an axial dimension greater than the combined thickness of the plate 19 and a plate 26 of the nozzle unit 2, which will be described below. A portion of the opening portion of the case 10 which protrudes beyond the two plates 19 and 26 defines a crimping portion 10*c* which is bent to an interior of the case 10. The crimping portion 10*c* corresponds to a fixing portion as recited in the claims, and is arranged to fix the plate 26, which corresponds to a first metal member provided in the nozzle unit 2, between the shoulder portion 10*b* and the crimping portion 10*c*.

(2) Nozzle Unit

Figure 4:
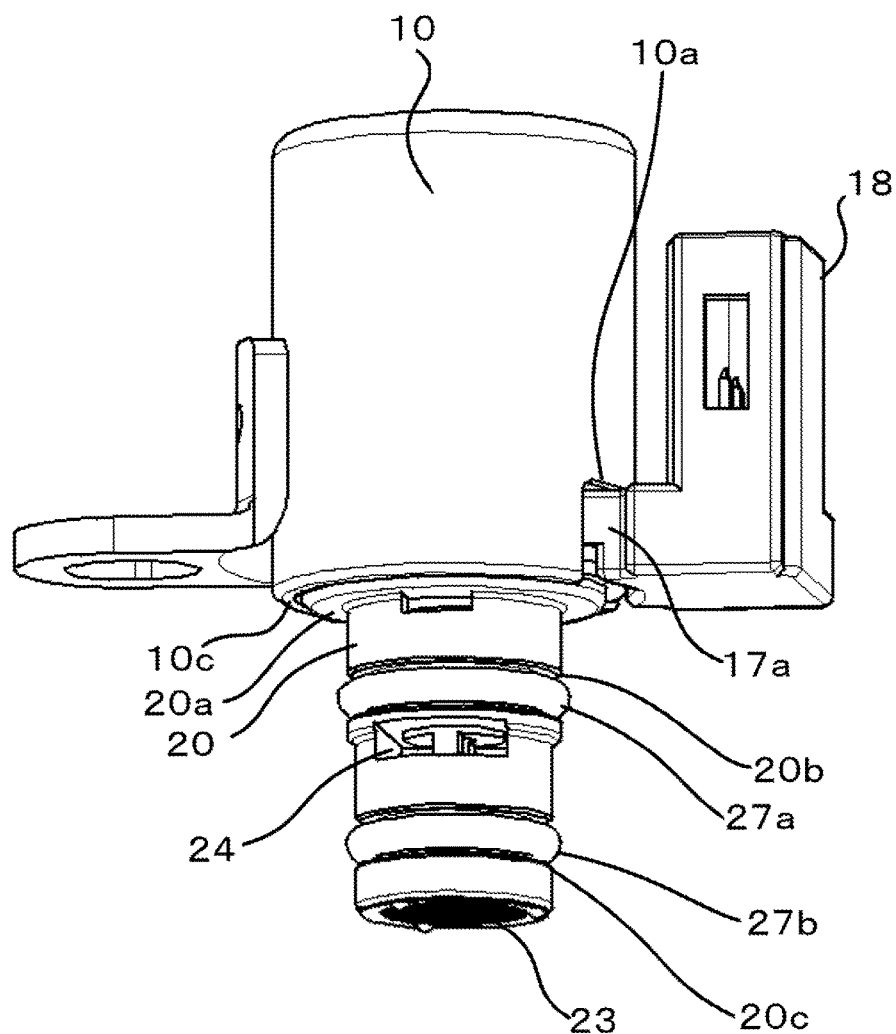
FIG. 4 is a perspective view of the solenoid valve device according to the first embodiment of the present invention in the assembled condition when viewed obliquely from below.

The nozzle unit 2 includes a substantially cylindrical nozzle 20 made of a resin and including an internal hollow portion 21. On the side closer to the solenoid unit 1, the nozzle 20 includes a pin receiving portion 22 in which the rod pin 11 is inserted, the pin receiving portion 22 being in communication with the hollow portion 21. A first port 23 and a second port 24, each of which is in communication with the hollow portion 21, and a valve body 25, which is driven by the rod pin 11 to open or close a communication between the first port 23 and the second port 24, are accommodated in the nozzle 20. In the present embodiment, the first port 23 is an in-port, and the second port 24 is an out-port. In the case of the normally low type as illustrated in FIG. 1, in order to arrange the valve body 25 in the hollow portion 21 inside of the resin, the valve body 25 is inserted into the first port 23 of the nozzle 20, and a resin cap 33 is thereafter fixed to the nozzle 20 through ultrasonic welding or heat welding to seal in the valve body 25. Note that, in the case of a normally high type as illustrated in FIG. 4, the nozzle 20 is molded by an insert molding process with a metal valve seat member having the valve body 25 accommodated therein as an insert to be arranged inside of the resin.

At an end portion of the nozzle 20 near the pin receiving portion 22, a flange 20*a* is defined integrally with the nozzle 20, and the first metal member as recited in the claims is fixed to a surface of the flange 20*a* which faces the solenoid unit 1. In the present embodiment, the first metal member is the plate 26, which is in the shape of a ring and is fixed to a circumference of the pin receiving portion 22. The plate 26 includes, in a central portion thereof, an opening portion in which the end portions of the rod pin 11 and the cylindrical core 12 on the side closer to the nozzle unit 2 are inserted, and the plate 26 has such an outside diameter that the plate 26 can be fitted to the inner circumference of the case 10.

The plate 26 includes a plurality of first holes 26*a* and a plurality of second holes 26*b* defined therein, and the first holes 26a and the second holes 26b are arranged alternately. A portion of the resin of the nozzle 20 penetrates through each first hole 26a, so that the plate 26 and the nozzle 20 are fixed to each other. A tip portion of the resin of the nozzle 20 arranged in each first hole 26a defines a projecting portion 20d arranged to project toward the solenoid unit 1 from a surface of the plate 26. Fixing of the plate 26 to the nozzle 20 such that the resin of the nozzle 20 is arranged in each first hole 26a can be accomplished in the following manner, as is similarly the case with the plate 19. That is, a tip of the projecting portion 20d inserted in the first hole 26a is subjected to heat welding, or the nozzle 20 is molded by an insert molding process with the plate 26 as an insert.

The first holes 19a and 26a and the second holes 19b and 26b defined in the two plates 19 and 26 have the following positional relationship. That is, the projecting portion 20d projecting from each first hole 26a in the plate 26 of the nozzle unit 2 is fitted into a corresponding one of the second holes 19b in the plate 19 of the solenoid unit 1, whereas the projecting portion 13d projecting from each first hole 19a in the plate 19 of the solenoid unit 1 is fitted into a corresponding one of the second holes 26b in the plate 26 of the nozzle unit 2.

An outer circumferential portion of the cylindrical nozzle 20 includes two annular grooves 20b and 20c with the second port 24 arranged therebetween, and O-rings 27a and 27b are fitted into the respective grooves 20b and 20c. When the solenoid valve device according to the present embodiment is attached to a control valve, the O-rings 27a and 27b ensure sealing between an outer circumference of the nozzle 20 and a wall surface of an attachment hole (not shown) defined in the control valve.

1-2. Beneficial Effects

Figure 3:
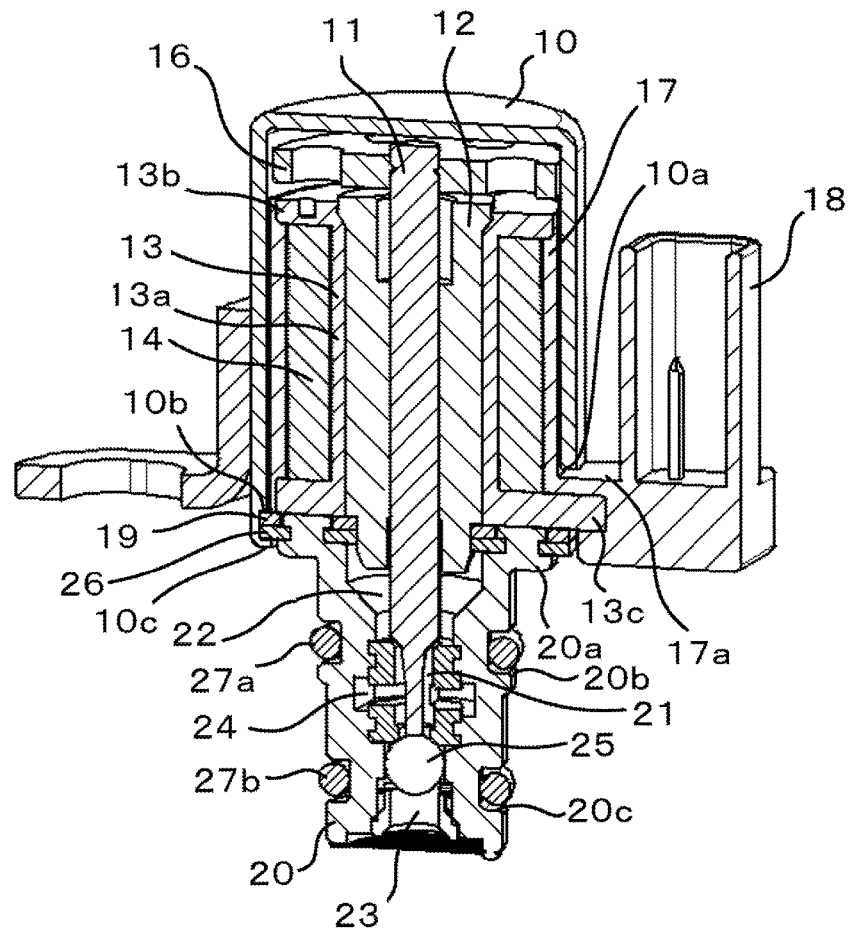
FIG. 3 is a perspective sectional view of the solenoid valve device according to the first embodiment of the present invention in an assembled condition when viewed obliquely from above.
Figure 5:
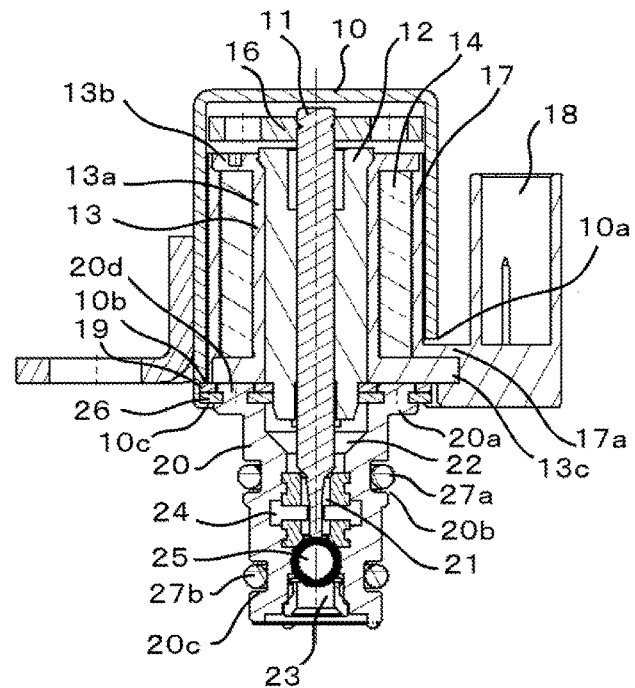
FIG. 5 is a sectional view of the solenoid valve device according to the first embodiment of the present invention.

As illustrated in FIGS. 1 and 2, in order to manufacture the solenoid valve device according to the present embodiment, the solenoid unit 1 and the nozzle unit 2 are first assembled separately. Thereafter, the plate 19 of the solenoid unit 1 and the plate 26 of the nozzle unit 2 are placed one upon the other to join the solenoid unit 1 and the nozzle unit 2 to each other as illustrated in FIGS. 3 to 5. More specifically, as illustrated in FIG. 3, the end portions of the rod pin 11 and the core 12 are passed through the central opening portion of the plate 26 to fit the plate 26 inside of the opening portion of the case 10, so that the two plates 19 and 26 are placed one upon the other.

In this case, since the projecting portions 13d of the bobbin 13 made of the resin project from the surface of the plate 19 of the solenoid unit 1, the projecting portions 13d are fitted into the second holes 26b defined in the plate 26 of the nozzle unit 2. At the same time, the projecting portions 20d of the nozzle 20 made of the resin, which project from the surface of the plate 26 of the nozzle unit 21, are fitted into the second holes 19b defined in the plate 19 of the solenoid unit 1. As a result, circumferential movement of the two plates 19 and 26 relative to each other is restrained, so that the solenoid unit 1 and the nozzle unit 2 are circumferentially positioned relative to each other.

Figure 6:
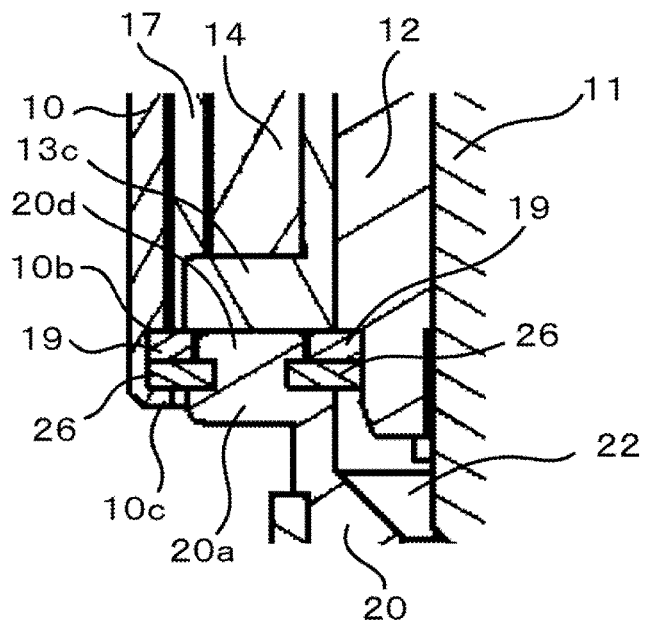
FIG. 6 is an enlarged sectional view illustrating a crimping portion according to the first embodiment of the present invention.
Figure 7:
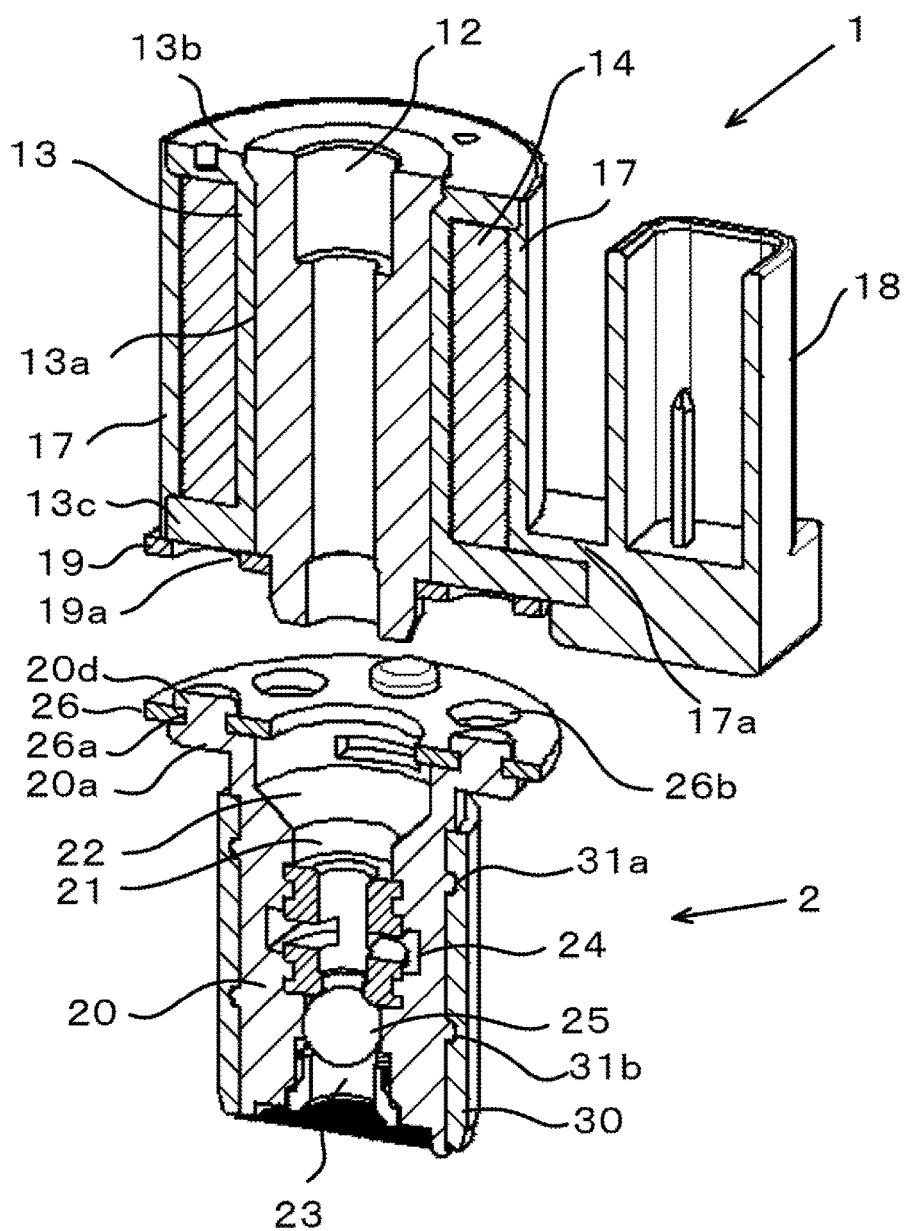
FIG. 7 is a perspective sectional view of a solenoid valve device according to a second embodiment of the present invention in a disassembled condition with a case removed therefrom when viewed obliquely from above.
Figure 8:
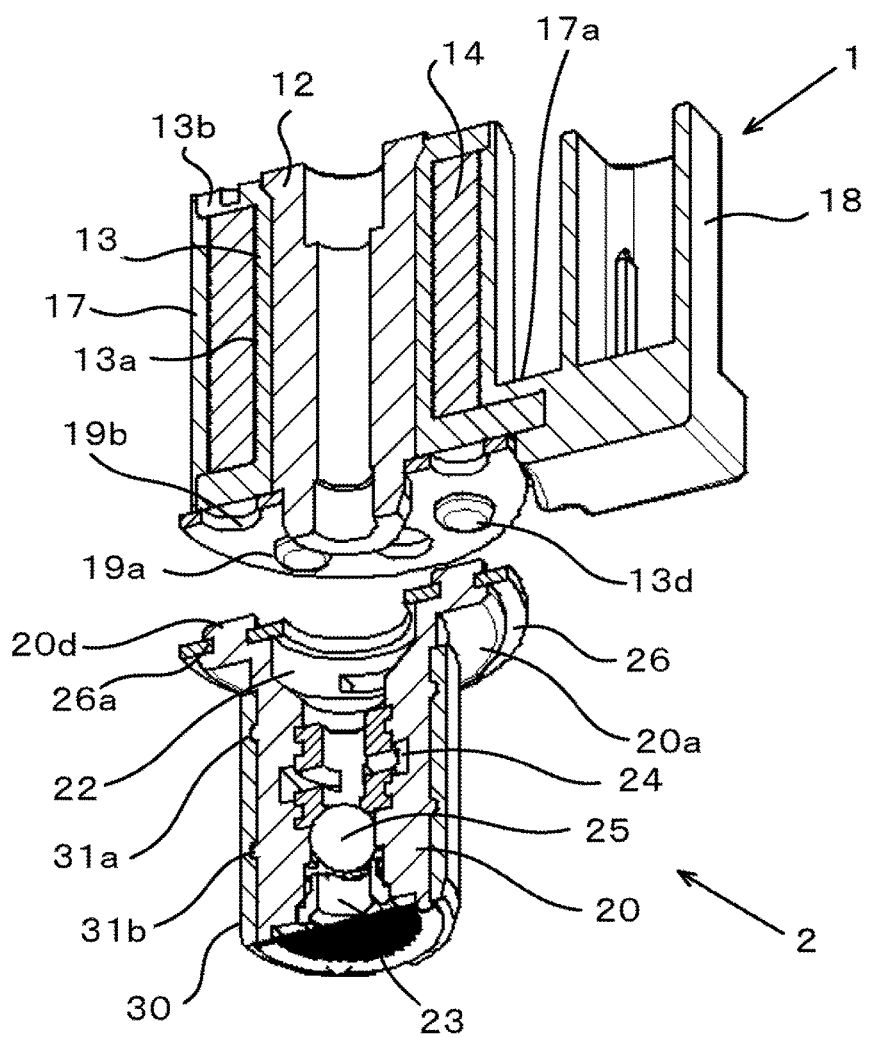
FIG. 8 is a perspective sectional view of the solenoid valve device according to the second embodiment of the present invention in the disassembled condition with the case removed therefrom when viewed obliquely from below.
Figure 9:
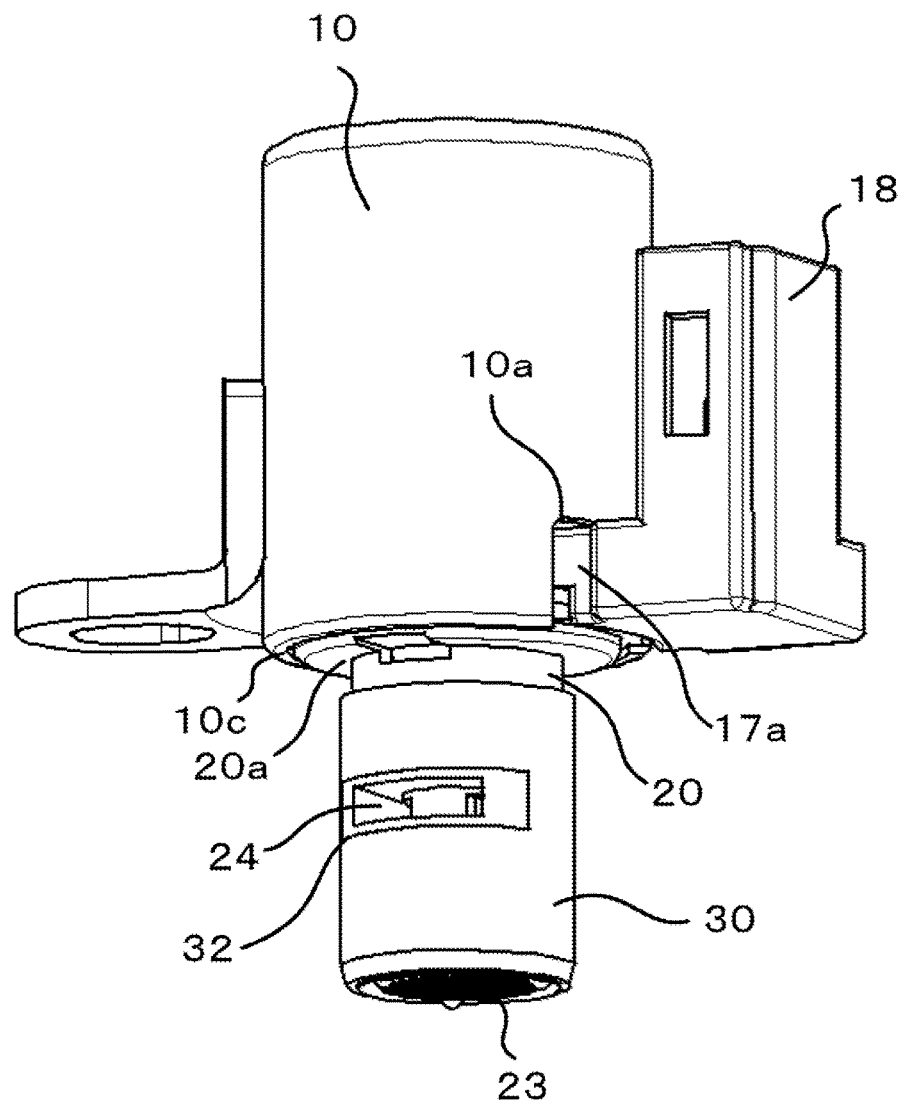
FIG. 9 is a perspective view of the solenoid valve device according to the second embodiment of the present invention in an assembled condition when viewed obliquely from below.
Figure 10:
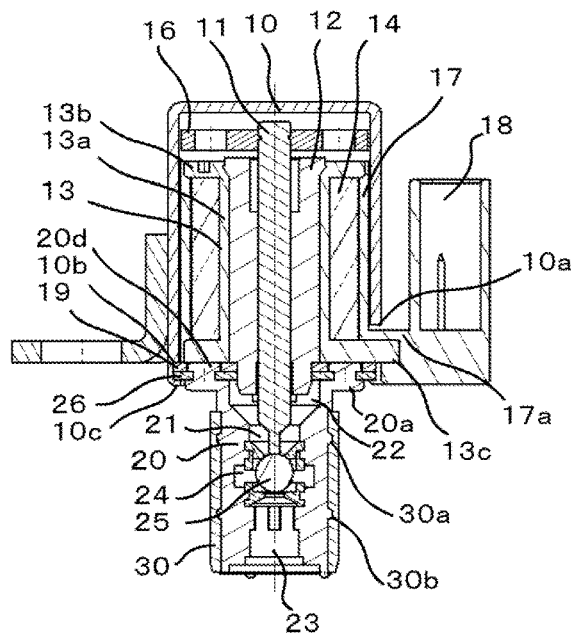
FIG. 10 is a sectional view of the solenoid valve device according to the second embodiment of the present invention in the assembled condition.

As illustrated in FIG. 6, in this situation, a circumference of the plate 19 is engaged with the shoulder portion 10b defined in the inner circumference of the case 10, and therefore, the two plates 19 and 26 and the nozzle unit 2 including the plate 26 fixed therein do not move further toward the bottom portion of the case 10. Meanwhile, the portion of the opening portion of the case 10 which is reduced in thickness includes the crimping portion 10c which protrudes toward the nozzle unit 2 beyond the two plates 19 and 26 placed one upon the other, and this crimping portion 10c is bent to the interior of the case 10, so that the plates 19 and 26 are tightly held between the crimping portion 10c and the shoulder portion 10b. As a result, the solenoid unit 1 and the nozzle unit 2 are securely fixed to each other by the crimping process performed on the case 10, which is made of a metal.

The solenoid valve device manufactured in the above-described manner is attached to the control valve, which is provided in a transmission, by fitting the nozzle unit 2 into the attachment hole defined in the control valve for attachment of a solenoid valve. In this case, each of the O-rings 27a and 27b fitted to an outer circumferential surface of the nozzle 20 closes a gap between the wall surface of the attachment hole and the outer circumferential surface of the nozzle 20 to prevent an oil leakage.

(1) Because the solenoid unit 1 and the nozzle unit 2 are defined by separate members, and the solenoid unit 1 and the nozzle unit 2 are fixed to each other by the crimping process to together form the solenoid valve device, various solenoid valve devices can be easily produced by combining an appropriate pair of a nozzle unit 2 and a solenoid unit 1 chosen from among nozzle units 2 and solenoid units 1 having different specifications.

(2) The solenoid unit 1 and the nozzle unit 2 can be easily fixed to each other by performing the crimping process on the case 10 made of the metal with the two plates 19 and 26 placed one upon the other, without the need for another member, such as, for example, a screw or an adhesive.

(3) The crimping portion 10c is defined using the opening portion of the case 10 made of the metal, and the shoulder portion 10b is defined in the inner circumference of the case 10 as the positioning contact portion for the two plates 19 and 26, and thus, the solenoid unit 1 and the nozzle unit 2 can be securely fixed to each other with the two plates 19 and 26, each of which is made of a metal and is excellent in strength, held between portions of a metal member which has a high strength.

(4) The two plates 19 and 26, each of which is made of the metal, are fixed to the bobbin 13, which is made of the resin, and the nozzle 20, which is made of the resin, respectively, by the insert molding process, and each of the plates and the resin are fixed to each other with a high strength. Moreover, the resin penetrates through each of the first holes 19a and 26a defined in the plates 19 and 26, respectively, and thus, the plates 19 and 26 are securely joined to the bobbin 13 and the nozzle 20, respectively, with excellent positioning accuracy. As a result, when the plates 19 and 26 are fixed by the crimping process, the solenoid unit 1 and the nozzle unit 2 are joined to each other with a high strength.

(5) Because the first holes 19a and 26a and the second holes 19b and 26b are defined in the two plates 19 and 26, and the projecting portions 13d and 20d projecting from the first holes 19a and 26a are fitted into the second holes 26b and 19b, the two plates 19 and 26 are circumferentially positioned relative to each other with accuracy. Accordingly, the solenoid unit 1 and the nozzle unit 2 are also circumferentially positioned relative to each other with high accuracy.

2. Second Embodiment 2-1. Structure

A second embodiment of the present invention will now be described below with reference to FIGS. 7, 8, 9, and 10. A solenoid unit 1 according to the present embodiment is similar in structure to the solenoid unit 1 according to the first embodiment, and a nozzle unit 2 according to the present embodiment is similar to the nozzle unit 2 according to the first embodiment except in the structure of an outer circumferential portion of a nozzle 20.

In the present embodiment, the grooves 20b and 20c and the O-rings 27a and 27b, which are provided in the first embodiment, are not arranged on an outer circumferential surface of the nozzle 20. A cylindrical metal cover 30 is arranged on the outer circumferential surface of the nozzle 20 according to the present embodiment. The metal cover 30 is arranged to have such an outside diameter that the metal cover 30 can be fitted in an attachment hole defined in a control valve for attachment of a solenoid valve device without a gap.

The metal cover 30 is fixed to the nozzle 20 by insert molding when the nozzle 20, which is made of a resin, is produced. An inner circumferential surface of the metal cover 30 includes, for example, two recessed portions 31a and 31b each of which extends in the circumferential direction, and a portion of the resin of the nozzle 20 enters into each of the recessed portions 31a and 31b, so that the metal cover 30 is fixed to the nozzle 20 so as not to be detached therefrom.

The metal cover 30 includes an opening portion 32 defined at a position corresponding to the position of a second port 24 of the nozzle 20, the opening portion 32 being slightly larger than the second port 24. When the nozzle 20 is molded by an insert molding process with the metal cover 30 as an insert, a portion of the resin of the nozzle 20 flows into an inner circumference of the opening portion 32 and is cured, so that a portion of the nozzle 20 around the second port 24 and the opening portion 32 of the metal cover 30 are engaged with each other to prevent the metal cover 30 from being detached from the nozzle 20 in the axial direction, in conjunction with the recessed portions 31a and 31b.

2-2. Beneficial Effects

As is the case with the solenoid unit 1 and the nozzle unit 2 of the solenoid valve device according to the first embodiment, the solenoid unit 1 and the nozzle unit 2 of the solenoid valve device according to the present embodiment are produced separately. Thereafter, with two plates 19 and 26 placed one upon the other, the plates 19 and 26 are held between a crimping portion 10c of a case 10 and a shoulder portion 10b, so that the solenoid unit 1 and the nozzle unit 2 are fixed to each other to together form a single unit.

When the solenoid valve device according to the present embodiment manufactured in the above-described manner is attached to the control valve, the nozzle 20 is inserted into the attachment hole defined in the control valve. Because the metal cover 30 having such an outside diameter that the metal cover 30 can be fitted in the attachment hole without a gap is arranged on an outer circumference of the nozzle 20, a wall surface of the attachment hole and an outer circumference of the metal cover 30 are brought into close contact with each other to ensure sufficient sealing therebetween to substantially prevent an oil leakage through an area where the solenoid valve device is fitted.

The present embodiment is able to achieve beneficial effects similar to those of the first embodiment. In particular, the solenoid unit 1 according to each of the first and second embodiments can be used in common to easily manufacture solenoid valve devices including nozzle units 2 having different structures. In addition, the solenoid valve device according to the present embodiment can be attached to the control valve with a sealing structure which is able to provide greater heat resistance and durability than a sealing member such as the O-ring.

3. Third Embodiment

Figure 11:
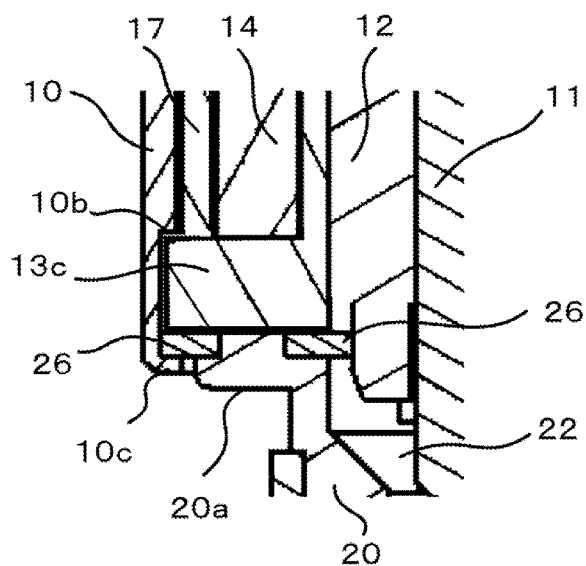
FIG. 11 is an enlarged sectional view illustrating a crimping portion according to a third embodiment of the present invention.

A third embodiment of the present invention will now be described below with reference to FIG. 11. In the present embodiment, a plate 26 defined by a metal member is provided only in a nozzle unit 2. While a resin of a nozzle 20 is arranged in each of first holes 26a of the plate 26 of the nozzle unit 2, the resin is fitted only in the plate 26, and does not project above a surface of the plate 26. Accordingly, a flange 13c of a bobbin 13 does not include a hole into which the resin of the nozzle 20 is fitted. Note, however, that a hole may be defined in the flange 13c, and a projecting portion 20d of the resin of the nozzle 20 may be fitted into the hole.

A solenoid unit 1 and the nozzle unit 2 according to the present embodiment can be fixed to each other by placing the flange 13c of the bobbin 13 and the plate 26, which is made of a metal, one upon the other, and bringing an outer circumferential portion of the flange 13c, which is defined at an outer circumference of the bobbin 13, which is made of a resin, into engagement with a shoulder portion 10b defined in an inner surface of a case 10 to achieve axial positioning. Thereafter, a crimping portion 10c of the case 10 is bent to hold the plate 26 and the flange 13c between the crimping portion 10c and the shoulder portion 10b to fix the solenoid unit 1 and the nozzle unit 2 to each other.

The present embodiment is also able to achieve beneficial effects similar to those of the first embodiment. In addition, because the plate 19 does not need to be provided in the solenoid unit 1 according to the present embodiment, the solenoid unit 1 can have a simplified structure, leading to a reduction in the number of parts.

4. Other Embodiments

The present invention is not limited to the above-described embodiments. The above-described embodiments have been presented by way of example only, and may be embodied in a variety of other forms. Various omissions, substitutions, and changes may be made without departing from the scope of the invention. These embodiments and modifications thereof fall within the scope and spirit of the invention and the scope of equivalents thereof. Examples thereof will now be described below.

(1) The plate 19 or 26 defined by a metal member may be provided in one or each of the solenoid unit 1 and the nozzle unit 2. Note that, considering the crimping process performed on the case 10, which is made of a metal, of the solenoid unit 1, it is preferable that the metal member be provided in the nozzle unit 2, since engagement between metals provides greater strength.

(2) Although, in each of the embodiments illustrated in the accompanying drawings, the edge of the opening portion of the case 10 is reduced in thickness over the entire circumferential extent of the edge to define the crimping portion 10c as the fixing portion, claw-shaped crimping portions arranged at specific intervals may be defined around the opening portion of the case 10.

(3) Although, in each of the embodiments illustrated in the accompanying drawings, the thickness of a portion of the case 10 is changed to define the shoulder portion 10b as the positioning contact portion, a wall surface of the case 10 may be recessed to define a projection which projects from the inner surface of the case 10, or a portion of the case 10 may be cut and bent inward to project from the inner surface of the case 10, to define the positioning contact portion.

(4) The position of the positioning contact portion is not limited to a vicinity of the opening portion of the case 10, but the positioning contact portion may be defined at a middle of the case 10 or near the bottom portion of the case 10, and the metal member and the bobbin 13 may thus be held between the positioning contact portion and the fixing portion to fix the solenoid unit 1 and the nozzle unit 2 to each other.

(5) The plate 19 and the bobbin 13 may be fixed to each other using screws or the like, and the plate 26 and the nozzle 20 may also be fixed to each other using screws or the like. Also, portions of the plates 19 and 26 may be used as inserts, when the bobbin 13 and the nozzle 20 are molded by the insert molding processes.

(6) Each of the first and second metal members is not limited to a ring-shaped member such as each of the plates 19 and 26, but a plurality of metal members each of which is in the shape of a circular arc may be arranged at specific intervals to together form a circular shape.

(7) The projecting portions 13d and 20d of the resins of the bobbin 13 and the nozzle 20 may not necessarily be arranged to project from the first holes 19a and 26a defined in the plates 19 and 26. Alternatively, a metal member having projecting portions in a surface thereof may be used, and the projecting portions, each of which is made of a metal, may be inserted into second holes 19b or 26b defined in another metal member.

(8) The projecting portions may be provided not in both the solenoid unit 1 and the nozzle unit 2 but only in one of the solenoid unit 1 and the nozzle unit 2. Also, in the case where the metal member is provided in only one of the units, the second holes, into which the projecting portions are inserted, may be defined directly in the flange 13c of the nozzle 13, which is made of the resin, or in a surface of the nozzle 20.

(9) A solenoid valve device according to an embodiment of the present invention may be of a normally high type, that is, the nozzle unit 2 may be of the normally high type.

While embodiments of the present invention have been described above, it is to be understood that variations and modifications will be apparent to those skilled in the art without departing from the scope and spirit of the present invention. The scope of the present invention, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A solenoid valve device comprising:
    a solenoid unit comprising:
        a rod pin movable in an axial direction;
        a cylindrical core comprising a magnetic material, and arranged around the rod pin to guide the rod pin;
        a bobbin comprising resin, and arranged to cover a side surface of the cylindrical core;
        a coil wound around the bobbin; and
        a case comprising a bottom and being cylindrical, having an opening portion at one axial end thereof, and arranged to accommodate the rod pin, the cylindrical core, the bobbin, and the coil; and
    a nozzle unit defined separately from the solenoid unit, and comprising:
        a nozzle comprising resin, a pin receiving portion in which the rod pin is inserted at one end thereof, and a port opening portion at another end thereof;
        a first port and a second port each of which is defined in the nozzle;
        a valve body arranged in the nozzle, and structured to be driven by the rod pin to open or close a communication between the first and second ports; and
        a first metal member fixed to an end portion of the nozzle on a side on which the rod pin is received; and
        a second metal member defined by a ring-shaped plate fixed to an end portion of the case on a side on which the opening portion is defined;
    wherein the solenoid unit comprises a positioning contact portion;
    the case comprises a fixing portion arranged to fix the first metal member between the positioning contact portion and the fixing portion;
    wherein the first metal member is a ring-shaped plate fixed to a circumference of the pin receiving portion;
    wherein the fixing portion is arranged to fix the first and second metal members between the positioning contact portion and the fixing portion with the first and second metal members placed one upon the other;
    wherein at least one of the first and second metal members comprises a plurality of holes defined therein, the resin of the nozzle or the resin of the bobbin is arranged in each of the holes, so that the first metal member and the nozzle, or the second metal member and the bobbin, are fixed to each other;
    wherein each of the first and second metal members comprises the plurality of holes defined therein, the plurality of holes comprising a first hole and a second hole;
    the resin of the nozzle or the resin of the bobbin is arranged in the first hole to penetrate through the corresponding metal member to fix the first metal member and the nozzle, or the second metal member and the bobbin, to each other; and
    in the second hole of one of the first and second metal members, a projecting portion of the resin penetrating through the first hole of another one of the first and second metal members placed upon the one of the first and second metal members is arranged.

2. The solenoid valve device according to claim 1, wherein the positioning contact portion is a shoulder portion defined in an inner circumferential surface of the case.

3. The solenoid valve device according to claim 1, wherein the first metal member is arranged to be in contact with the bobbin, and the positioning contact portion is arranged at such a position as to prevent the bobbin from moving in the axial direction in the case.

4. The solenoid valve device according to claim 1, wherein
    the nozzle is fitted into an attachment hole defined in a control valve of a transmission for attachment of the solenoid valve device;
    the nozzle unit further comprises a metal cover arranged to cover an entire outer circumferential surface of the nozzle; and
    the metal cover is arranged to close a gap between a wall surface of the attachment hole for the attachment of the solenoid valve and an outer circumferential surface of the nozzle.

5. The solenoid valve device according to claim 1, wherein the nozzle is fitted into an attachment hole defined in a control valve of a transmission for attachment of a solenoid valve;

the nozzle unit further comprises a ring-shaped sealing member arranged on an outer circumferential surface of the nozzle; and the sealing member is arranged to close a gap between a wall surface of the attachment hole for the attachment of the solenoid valve and an outer circumferential surface of the nozzle.

* * * * *